No. 669,692. Patented Mar. 12, 1901.
M. HARLOE.
VEHICLE TIRE.
(Application filed Oct. 27, 1900.)
(No Model.)
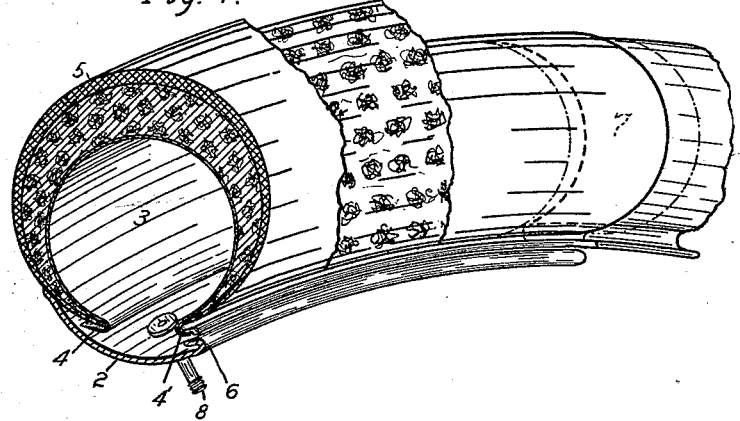
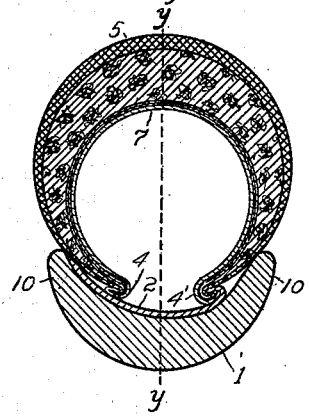
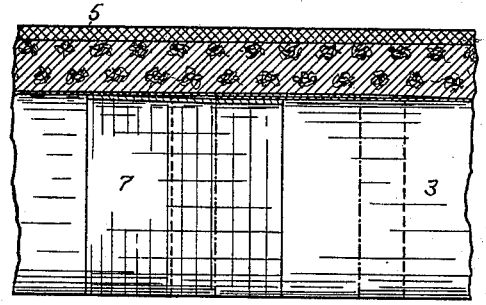
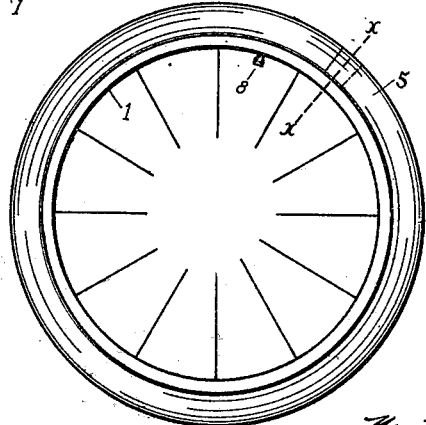
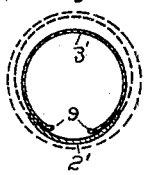
WITNESSES:
Geo. G. Glatt.
R. G. Moran.
INVENTOR
Morton Harloe
BY
D. B. Replogle
ATTORNEY
THE NORRIS PETERS CO., PHOTO-LITHO., WASHINGTON, D. C.

UNITED STATES PATENT OFFICE.

MORTON HARLOE, OF HAWLEY, PENNSYLVANIA, ASSIGNOR OF ONE-HALF TO WILTON S. BLOES, OF PECKVILLE, PENNSYLVANIA.

VEHICLE-TIRE.

SPECIFICATION forming part of Letters Patent No. 669,692, dated March 12, 1901.

Application filed October 27, 1900. Serial No. 34,620. (No model.)

*To all whom it may concern:*

Be it known that I, MORTON HARLOE, a citizen of the United States, residing at Hawley, in the county of Wayne and State of Pennsylvania, have invented certain new and useful Improvements in Vehicle-Tires, of which the following is a specification, reference being had therein to the accompanying drawings.

This invention relates to tires for road-vehicles—such as bicycles, automobiles, and horse-carriages—and has for its objects to provide an inflatable non-puncturable tire, to increase the resiliency, to unite metallic and rubber tubes in the construction of such tires, and other objects, as are more fully pointed out in the claims.

To this end the invention consists of the construction, arrangement, and combination of the several parts illustrated in the accompanying drawings, in which—

Figure 1 shows a side elevation of a part of a vehicle-wheel on which my tire is used. Fig. 2 is a view in cross-section taken on the line $x\ x$ of Fig. 1. Fig. 3 is a view in cross-section taken on the line $y\ y$ of Fig. 2 and showing the construction of the tire at a joint. Fig. 4 is a general view of a section of my tire, showing the construction wherein the metallic tube is not lapped and also showing the several laminæ of rubber, cork, and metal which enter into the construction of the tire. Fig. 5 shows a substitute method of closing the metallic part of the tire where it is adapted to insert the same into the common form of hose-pipe tire now in use.

Similar characters of reference denote like and corresponding parts throughout the several views.

In the drawings, 1 designates the usual concave rim of a wheel to which the tire is adapted to be fitted and may be constructed from wood or metal, as desired.

2 is a circular rubber strip adapted to form the attachment of the tire to the rim and also to close the edges of the main portion of the tire, which is constructed principally from a metallic tubular ring or band 3, extending clear around the wheel and having its ends telescoping, or it may be constructed in several sections having their several ends telescoped, so as to form a substantially continuous circular tube, with the inner side open and being capable of being closed by the rubber strip 2 or a substitute for it, as 2' in Fig. 5. The metal of the tube 3 is swaged or hooked over at its edges 4 4', thus constructing a pair of lips or flanges extending around the wheel and adapted to rest against the rim aforesaid, so as to present a round smooth surface to the rubber. The metal tube is adapted to be incased in a tough rubber or leather shoe 5, which is also a continuous tubular piece and incloses the metallic tube aforesaid on all of the sides except next to the rim, its edges extending into and terminating within the hooked-over portions 4 4' of the metallic rim. The fabric from which the shoe is constructed is thinned down on the 4' side and lies closely against the metal within the hooked portion 4', and is adapted to be secured therein by hooking on top of it the lapped-over portion 6 of the rubber strip 2. Between the metallic inner tube and the shoe the space is filled with any suitable springy material, as cork, which may be placed in in strips cut to conform to the space, or it may be filled from cork shavings or chips packed into a suitable incasement and fitted into the space, the object of it being to produce a tread, so as to protect the inner metallic tube from indentations by pebbles, sharp stones, and the like in the road. At the joint where the metallic tube laps a strip of rubber 7 is cemented securely to the inner surface of the metallic tube, extending over the joint, as particularly shown in Figs. 2 and 3, which expose longitudinal and transverse cross-sections, respectively, of the said rubber strip. There is no objection to extending the rubber strip 7 entirely around the inner side of the metallic tube, and where the tube is constructed with several joints it may be found preferable to so extend the rubber strip. The essential feature of the strip is that it covers the joint from within and has its edges extending under the lips or hooks 4 4', so that the pressure brought on its edges when inflation is made will make a perfect air-tight joint. The ends of the strip are cemented to the inner surface of the metallic tube, so as also to make an air-tight joint. The dashed lines in Fig. 4 show the limits of the strip, while the dotted lines in that figure show the inner limit of the telescoped end of the metallic tube. In Fig. 3 the telescoped ends of the metallic tube are shown in dashed lines and the rubber strip in full lines. After the rubber sealing-strip 7 is secured to the necessary portion or portions of the inner tube the lap 6 is hooked into the hook 4' and may be thoroughly cemented there, if desired. It will, however, form an air-tight joint without cement when it is inflated on the rim, but will not bear inflation when not placed on the rim. When the substitute form in Fig. 5 is used, the sealing-strip 7 is applied, and then the strip 2' is applied and cemented to both edges of the metallic tire the entire distance around, sealing it completely. In the substitute form the hooks 4 4' are dispensed with and the inner metallic tube is left plain or has its edges slightly curved up, as shown at 9.

In attaching the tires to the rim the inner edges of the metallic tube and parts connected with it are bent inward and upward and the tube stretched until it will pass over the lips 10 10 of the rim. When placed in the trough of the rim, the nipple 8 extending through and opening in the rim, the tire is ready for inflation by the usual air-pump to be attached to the nipple 8. As inflation proceeds the pressure of the air within pressing outward equally on the walls of the metallic tube compresses the hooks 4 4' downward and outward against the rim, completely sealing the joint by pressing the under round sides of the metallic hooks against the rubber strip 2 or, if the substitute form is used, by pressing simply the edges of the metallic tube against the rubber strip 2'. In adjusting the tire to the rim by inflation the ends of the metallic tube slide upon themselves until they reach a point where the pressure of the shoe from the outside and the pressure on the rim on the inside are about equal, and for this purpose provision for the sliding or telescoping of the ends is made in the vicinities shown between the dotted and dashed lines, as shown in Fig. 3, the cork filling being adapted to be compressed or stretched to accommodate itself to the contracting or stretching of the metallic tube and the rubber strip likewise being adapted to adjust itself so as to keep the joint continually sealed whether the metallic tubes are drawn farther apart or telescoped closer. By this construction I have a complete inflatable tire with a continuous metallic lining non-puncturable by the usual pins, tacks, nails, and the like, as the metal from which the metallic tube is made may be of the hardest and toughest steel.

Having thus described my invention, what I claim as new, and desire to secure by Letters Patent, is—

1. As a new article of manufacture the herein-described vehicle-tire comprising an inner metallic tube having telescoping ends, a sealing-strip of rubber adapted to cover the joint at said telescoping ends, a padding of cork or other suitable springy material adapted to surround said metallic tube, and a tubular shoe or incasement adapted to incase the said metallic tube with surrounding springy material aforesaid, in combination with means for attaching the whole to a rim of a vehicle-wheel, substantially as specified.

2. In combination with an inflatable vehicle-tire, a metallic tubular lining adapted to be inserted within the said inflatable tire, the said tubular lining being constructed with a telescoping joint, and the said joint being adapted to be sealed by a rubber strip having its edges cemented to the telescoping parts at lines distant from the edges of the metallic joint whereby contraction and expansion of the joint is permitted without unsealing or disconnecting the rubber strip, substantially as specified.

3. In a vehicle-tire, the combination with the concave rim of a vehicle of a pliable tubular shoe provided with an inner layer of springy soft material, and the interior of said tubular shoe being further provided with a non-puncturable metallic casing having telescoping joints, and a rubber strip adapted to seal said joints so as to make them air-tight when the tire is inflated; and the said tire when inflated adapted to hold the edges of the metallic tube and the shoe aforesaid against the rim of the vehicle aforesaid so as to form an air-tight joint, substantially as specified.

In testimony whereof I affix my signature in presence of two witnesses.

MORTON HARLOE.

Witnesses:
  D. G. MORAN,
  M. M. MORAN.